US008751422B2

(12) United States Patent
Pistoia et al.

(10) Patent No.: US 8,751,422 B2
(45) Date of Patent: Jun. 10, 2014

(54) USING A HEURISTICALLY-GENERATED POLICY TO DYNAMICALLY SELECT STRING ANALYSIS ALGORITHMS FOR CLIENT QUERIES

(75) Inventors: Marco Pistoia, Hawthorne, NY (US); Takaaki Tateishi, Kanagawa (JP); Omer Tripp, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 13/270,732

(22) Filed: Oct. 11, 2011

(65) Prior Publication Data

US 2013/0091082 A1 Apr. 11, 2013

(51) Int. Cl.
*G06N 5/00* (2006.01)

(52) U.S. Cl.
USPC .................................. 706/13; 704/9; 707/736

(58) Field of Classification Search
USPC .......................................................... 706/13
See application file for complete search history.

(56) References Cited

U.S. PATENT DOCUMENTS

| 7,530,107 B1 | 5/2009 | Ono |
| 7,822,699 B2 | 10/2010 | Katariya et al. |
| 2005/0222987 A1* | 10/2005 | Vadon ............................... 707/3 |
| 2008/0147642 A1* | 6/2008 | Leffingwell et al. ............... 707/5 |
| 2009/0287678 A1 | 11/2009 | Brown et al. |
| 2009/0327172 A1 | 12/2009 | Liu et al. |
| 2010/0043048 A1 | 2/2010 | Dolby et al. |
| 2010/0205123 A1 | 8/2010 | Sculley et al. |

* cited by examiner

*Primary Examiner* — Jeffrey A Gaffin
*Assistant Examiner* — Kalpana Bharadwaj
(74) *Attorney, Agent, or Firm* — Patents on Demand P.A.; Brian K. Buchheit; Scott M. Garrett

(57) ABSTRACT

A method for dynamically selecting string analysis algorithms can begin with the training of the dynamic string analysis handler of a string analysis module to effectively handle a subset of string queries having contextual metadata received from a client application in an instructional environment. The effectiveness of the training module can be based upon feedback from the client application. Upon completion of the training, a string analysis algorithm selection policy can be synthesized. The string analysis algorithm selection policy can correlate a context of a string query in the subset to the usage of a string analysis algorithm. When in the operational environment, the dynamic string analysis handler can dynamically handle string queries having contextual metadata received from the client application in accordance with the string analysis algorithm selection policy. The string analysis algorithm to be used for a string query can be dynamically and independently determined.

16 Claims, 5 Drawing Sheets

100

200

USING A HEURISTICALLY-GENERATED POLICY TO DYNAMICALLY SELECT STRING ANALYSIS ALGORITHMS FOR CLIENT QUERIES

BACKGROUND

The present invention relates to the field of software analysis.

String analysis is a technique used to infer and analyze the contents of string variables generated by the operation of software applications. String analysis is a particularly beneficial tool used for detecting and assessing security vulnerabilities of software applications like cross-site scripting (XSS) vulnerabilities of Web applications or access-control policy violations.

BRIEF SUMMARY

One aspect of the present invention can include a method for dynamically selecting string analysis algorithms. When in an instructional environment, the dynamic string analysis handler of a string analysis module can be trained to effectively handle a subset of string queries having contextual metadata received from a client application. The dynamic string analysis handler can be operating in a training mode and the effectiveness of the dynamic string analysis handler can be based upon feedback from the client application. The subset of string queries can represent a spectrum of string queries expected to be generated by the client application in an operational environment. Upon completion of the training, a string analysis algorithm selection policy can be synthesized for the client application. The string analysis algorithm selection policy can be based upon the interactions between the dynamic string analysis handler and client application when handling the subset of string queries during training. The string analysis algorithm selection policy can correlate a context of a string query in the subset to the usage of a string analysis algorithm. When in the operational environment, the dynamic string analysis handler can dynamically handle string queries having contextual metadata received from the client application in accordance with the string analysis algorithm selection policy. The dynamic string analysis handler can be operating in a production mode. The string analysis algorithm to be used for a string query can be dynamically and independently determined.

Another aspect of the present invention can include a system for dynamically selecting string analysis algorithms. Such a system can include a client application and a string analysis module. The client application can be configured to issue query requests comprised of a string query that requires string analysis and associated contextual metadata. The string analysis module can be configured to provide the client application with results of the string analysis responsive to issued query requests. The string analysis module can further include string analysis algorithms and a dynamic string analysis handler. The string analysis algorithms can represent different string analysis techniques. The dynamic string analysis handler can be configured to, when in a training mode, utilize a heuristic strategy to synthesize a string analysis algorithm selection policy based upon interactions with the client application in an instructional environment. An interaction can be comprised of a query request from the client application, a response to the query request by the dynamic string analysis handler, and selection feedback from the client application regarding the response. The query request of the interaction can utilize a subset of string queries expected to be generated by the client application in an operational environment. When in a production mode, the dynamic string analysis handler can utilize the string analysis algorithm selection policy to dynamically select string analysis algorithms to provide responses to query requests issued by the client application in the operational environment.

Yet another aspect of the present invention can include a computer program product that includes a computer readable storage medium having embedded computer usable program code. The computer usable program code can be configured to, when operating in a training mode, handle a subset of string queries having contextual metadata received from a client application in an instructional environment. The effectiveness of the handling of the subset of string queries can be based upon feedback from the client application. The subset of string queries can represent a spectrum of string queries expected to be generated by the client application in an operational environment. The computer usable program code can be configured to, upon completion of the handling of the subset of string queries, synthesize a string analysis algorithm selection policy for the client application. The string analysis algorithm selection policy can be based upon the handling of the subset of string queries while in the training mode. The string analysis algorithm selection policy can correlate a context of a string query in the subset to the usage of a string analysis algorithm. The computer usable program code can be configured to, when operating in a production mode, dynamically handle string queries having contextual metadata received from the client application in the operational environment in accordance with the string analysis algorithm selection policy. The string analysis algorithm to be used for a string query can be dynamically and independently determined.

DETAILED DESCRIPTION

Figure 1:
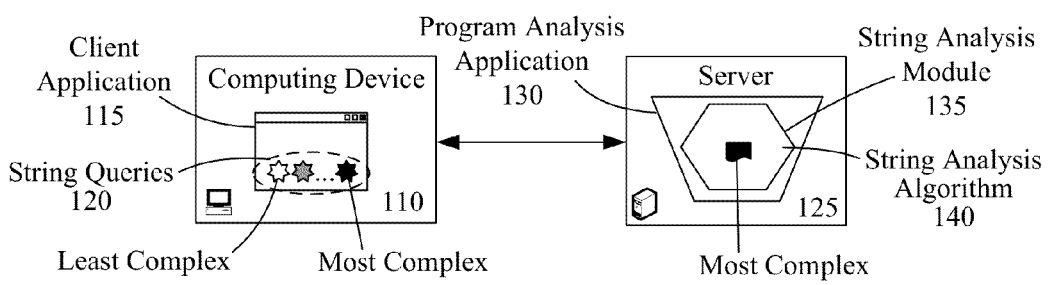
FIG. 1 (PRIOR ART) is a functional diagram illustrating the current handling of string analysis algorithm selection for the string queries of a client application.

The typical approach of most software tools when providing string analysis functionality is illustrated by system 100 of FIG. 1. The client application 115 running on the computing device 110 will issue various string queries 120 to the program analysis application 130 running on a server 125. Although the level of complexity for the string queries 120 of the client application 115 is variable, the string analysis module 135 of the program analysis application 130 responds to all the string queries 120 using the same string analysis algorithm 140, which will typically be chosen so as to be able to handle the most complex string query 120 of the client application 115.

This leads to instances where the program analysis application 130 uses a string analysis algorithm 140 having a greater complexity than required for effectively analyzing a string query 120 received from the client application 115. That is, a string analysis algorithm 140 of greater complexity is executed for a string query 120 of lesser complexity, which is costly in terms of resources and may obscure the results of the analysis (i.e., produce false positives/negatives). Disadvantages of system 100 were discovered and/or identified by the inventors during the source of discovering inventive details expressed herein, which overcome perceived shortcomings of system 100.

The disclose provides a solution for using a heuristically-generated policy to dynamically select string analysis algorithms for client queries. The dynamic string analysis handler of a string analysis module can be trained on a subset of client queries in an instructional setting. The dynamic string analysis handler can utilize a heuristic strategy combined with feedback from the client application to synthesize a string analysis algorithm selection policy for the client application. The dynamic string analysis handler and string analysis algorithm selection policy can then be used in an operation environment to dynamically select and execute string analysis algorithms for received client queries.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
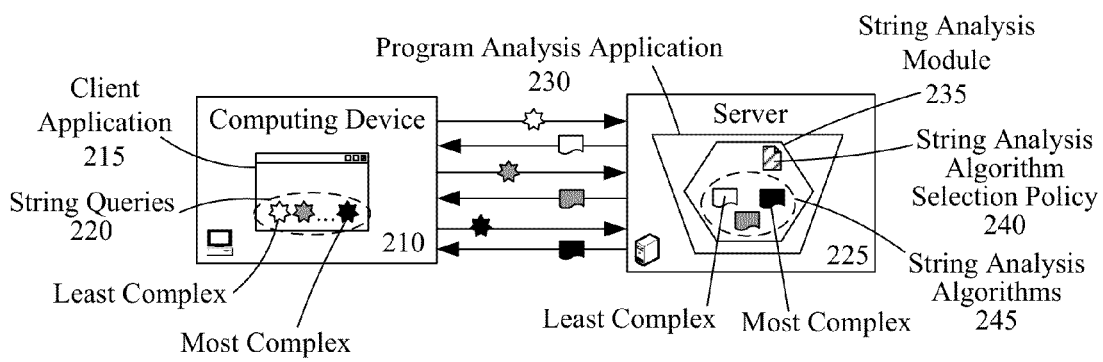
FIG. 2 is a high-level functional diagram illustrating a system that dynamically selects a string analysis algorithm that is commensurate with the complexity of a string query received from a client application in accordance with an embodiment of the inventive arrangements disclosed herein.

FIG. 2 is a high-level functional diagram illustrating a system 200 that dynamically selects a string analysis algorithm 245 that is commensurate with the complexity of a string query 220 received from a client application 215 in accordance with embodiments of the inventive arrangements disclosed herein. In system 200, the client application 215 can operate upon a computing device 210, issuing string queries 220 to the program analysis application 230 running on a server 225.

However, unlike the program analysis application 130 of system 100, the program analysis application 230 of system 200 can address each string query 220 with a string analysis algorithm 245 having an appropriate level of complexity. This can be illustrated in system 200 with the different colored exchanges between the computing device 210 and the server 225.

As shown in this example, the program analysis application 130 can use the white string analysis algorithm 245, representing a low level of complexity, for a corresponding white string query 220; a string analysis algorithm 245 of medium complexity, in grey, for a grey string query 220; and, a more complex string analysis algorithm 245, in black, for a black string query 220.

It should be noted that this is a simple example for the purpose of illustration and that determination of the specific string analysis algorithm 245 to use for a specific string query 220 can result in the usage of a string analysis algorithm 245 having a higher level of complexity for a string query 220 of less complexity. Such detail can be discussed in later Figures.

To achieve such flexibility, the program analysis application 230 can utilize a string analysis module 235 configured to dynamically select the string analysis algorithms 245 using a string analysis algorithm selection policy 240 specific for the client application 215. The string analysis algorithm selection policy 240 can define how the string analysis module 235 handles the string queries 220 from the client application 215.

Thus, the string analysis module 235 can handle each received string query 220 with the string analysis algorithm 245 that best addresses the needs of the string query 220 and/or client application 215.

Figure 3:
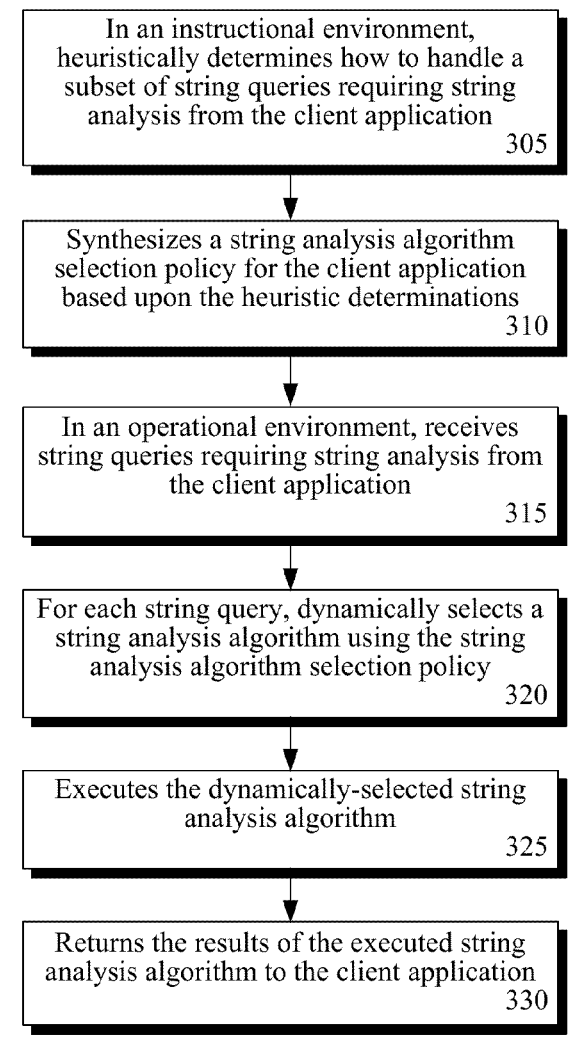
FIG. 3 is a flow chart of a method describing the general operation of a string analysis module that dynamically selects a string analysis algorithm to address a string query in accordance with an embodiment of the inventive arrangements disclosed herein.

FIG. 3 is a flow chart of a method 300 describing the general operation of a string analysis module that dynamically selects a string analysis algorithm to address a string query in accordance with embodiments of the inventive arrangements disclosed herein.

Method 300 can begin in step 305 where, in an instructional environment, the string analysis module can heuristically determine how to handle of subset of string queries that require string analysis from the client application. The string queries included in the subset can be representative of the spectrum of complexity expected from the client application.

The instructional environment can be a computing environment in which operation of the string analysis module can be monitored and/or modified without detrimentally affecting the program analysis application and/or client application. For example, the instructional environment can be a software development environment or a secondary production environment.

The string analysis algorithm selection policy can then be synthesized for the client application from the heuristic determinations in step 310. Steps 305 and 310 can represent a training mode of the string analysis module where the string analysis module can learn how to best address the string queries of the client application.

Upon completion of steps 305 and 310, the string analysis module can be placed in an operational environment where is can receive string queries from the client application in step 315. The string queries received in step 315 can include those of the subset used in step 305 as well as others.

In step 320, a string analysis algorithm can be dynamically selected for each string query using the string analysis algorithm selection policy. The dynamically-selected string analysis algorithm can then be executed in step 325 and the results returned to the client application in step 330.

It should be noted that the string analysis algorithm selection policy can be specific to the client application. That is, a string analysis algorithm selection policy synthesized for a JAVA client application may not function properly if used to handle string queries from a PHP client application. Likewise, the string analysis algorithm selection policy produced to handle a banking client application may not be able to handle the string queries from a computer security client application. Therefore, steps 305 and 310 can be repeated for different types of client applications and step 320 can be expanded to account for selecting the appropriate string analysis algorithm selection policy to use for the specific client application.

Figure 4:
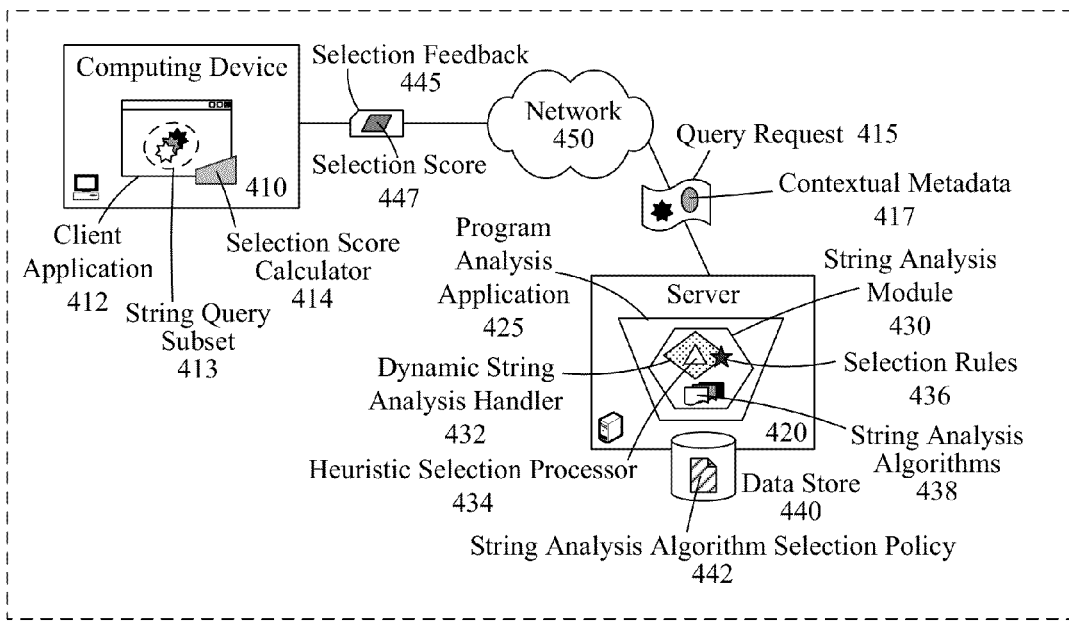
FIG. 4 is a collection of schematic diagrams of a system in an instructional environment and a system in an operational environment that illustrate the use of a dynamic string analysis handler of a string analysis module for the dynamic policy-based selection of string analysis algorithms in accordance with embodiments of the inventive arrangements disclosed herein.
Figure 4:
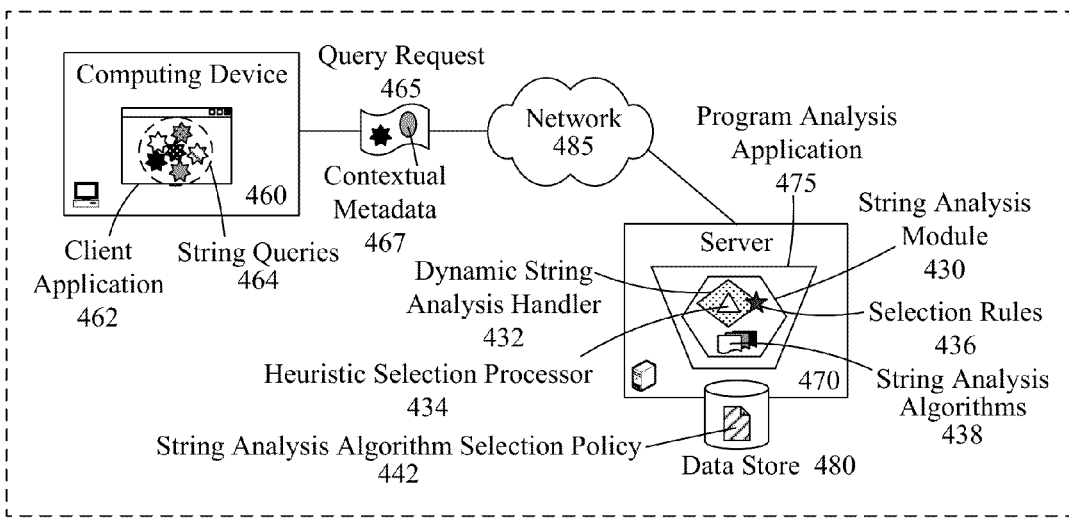

FIG. 4 is a collection 400 of schematic diagrams of a system 405 in an instructional environment and a system in an operational environment 455 that illustrate the use of a dynamic string analysis handler 432 of a string analysis module 430 for the dynamic policy-based selection of string analysis algorithms 438 in accordance with embodiments of the inventive arrangements disclosed herein. The systems 405 and 455 of collection 400 can perform the steps of method 300 and/or represent a specific embodiment of functional diagram 200.

The components of system 405 can operate in an instructional environment. As previously discussed, the instructional environment can be a computing environment in which operation of the string analysis module 430 can be monitored and/or modified without detrimentally affecting the program analysis application 425 and/or client application 412.

In system 405, the client application 412 can operate from a computing device 410 capable of communicating with the server 420 hosting the program analysis application 425 over the network 450. The computing device 410 can represent a variety of electronic devices capable of supporting operation of the client application 412 and network 450 communications.

The client application 412 can represent a specific software program or can be a software program that is representative of a general type of software programs (i.e., a baseline for Web applications written in JAVA). The client application 412 can be configured to send the contents of a string query subset 413 as query requests 415 to the program analysis application 425.

The client application 412 can be further configured to supply contextual metadata 417 for a string query 413 in the query request 415. The contextual metadata 417 can be used to provide information about the context in which the string query 413 was issued. Additionally, the contextual metadata 417 can also signify performance parameters that a selected string analysis algorithm 438 should meet.

Examples of information that can be supplied as contextual metadata 417 can include, but are not limited to, metrics measuring the complexity of the issuance (e.g., cyclomatic complexity), the type of string analysis typically performed on the string query 413, an indicator for recursive issuance, an amount of time allowed for the string analysis, a degree of accuracy required for the result, and the like.

The program analysis application 425 can represent the software program being used to analyze the client application 412. The program analysis application 425 can be a component of a larger software application. Further, the program analysis application 425 can be configured to interact with the client application 412 in a variety of architectures, such as client-server (shown in this example) or a service-oriented architecture (SOA).

As shown in system 405, the program analysis application 425 can operate on a server 420 having a data store 440. The server 420 can represent the hardware and/or software components necessary to support operation of the program analysis application 425. Query requests 415 received by the program analysis application 425 can be handled by the string analysis module 430.

The string analysis module 430 can represent the software component of the program analysis application 425 configured to perform string analyses. Unlike a conventional implementation, the string analysis module 430 of system 405 can include a dynamic string analysis handler 432, selection rules 436, and multiple string analysis algorithms 438.

In the instructional environment, the dynamic string analysis handler 432 can be the component of the string analysis module 430 that is being trained to handle the string query subset 413 of the client application 412. Training of the dynamic string analysis handler 432 can utilize a heuristic strategy that can be embodied by the heuristic selection processor 434.

The heuristic selection processor 434 can utilize its inherent heuristic strategy in conjunction with the selection rules 436 to determine which string analysis algorithm 438 should be used based on the contextual metadata 417 of the received string query 413. The selection rules 436 can represent basic rules and/or requirements regarding string analysis and/or string queries 413.

For example, for a computer security analysis client application 412, the selection rules 436 can indicate that a string analysis algorithm 438 based on monadic second-order logic should be used for verifying the correctness of a downgrader, while the elimination of false cross-site scripting (XSS) reports can use either a string analysis algorithm based on an abstraction of strings as regular expressions or a string analysis algorithm that uses a context-free language representation of strings, depending on whether efficiency or accuracy, respectively, is required.

Further, some of selection rules 436 can be designated as user-configurable to allow for a user or administrator of the program analysis application 425 to adjust how the string analysis algorithms 438 are selected.

Since heuristic learning relies on the evaluation of the decisions that have been made, the computing device 410 running the client application 412 can be configured with a selection score calculator 414 to provide selection feedback 445 to the dynamic string analysis handler 432. The selection score calculator 414 can be a software program that can interact with the client application 412 for the purposes of determining a selection score 447 for the dynamic string analysis handler's 432 response to a query request 415. The specific implementation (e.g., background service, add-on, plug-in, etc.) of the selection score calculator 414 can be dependent upon the configuration of the computing device 410, client application 412 and/or program analysis application 425.

The selection score 447 can be a quantification of how effective the string analysis algorithm 438 chosen by the heuristic selection processor 434 was for the client application 412. The selection score 447 can make such a determination in accordance with a predefined equation that can utilize a variety of quantifiable metric values like response time and accuracy.

Depending upon the value of the selection score 447 contained in the selection feedback 445, the dynamic string analysis handler 432 can adjust the selection process used by the heuristic selection processor 434. For example, the dynamic string analysis handler 432 can adjust weighted values that the heuristic selection processor 434 assigns to the different string analysis algorithms 438 as they apply to the context of the query request 415.

Thus, the dynamic string analysis handler 432 can continue handling the string query subset 413 until a predetermined competency level or termination condition is reached. Once training of the heuristic selection processor 434 is complete, the dynamic string analysis handler 432 can synthesize the string analysis algorithm selection policy 442, storing the string analysis algorithm selection policy 442 in the designated data store 440.

The string analysis algorithm selection policy 442 can represent the decision-making process for selecting string analysis algorithms 438 for the client application 412 as learned by the dynamic string analysis handler 432 in the instructional environment. The string analysis algorithm selection policy 442 can be of a format that is interpretable by the dynamic string analysis handler 432.

The purpose of spending time training the dynamic string analysis handler 432 in the instructional environment can be to improve the efficiency of the program analysis application 475 in the operational environment of system 455. The operational environment can be a computing environment where the program analysis application 475 utilizes live data, analogous to a software production environment.

As in the instructional environment, the operational environment can include a client application 462 operating on a computing device 460 that sends query requests 465 to the program analysis application 475 hosted by a server 470 that has a data store 480 containing the string analysis algorithm selection policy 442. The computing device 460 can be an electronic device capable of supporting operation of the client application 462 and communicating with the server 470 over the network 485.

In the operational environment, the client application 462 can be configured to send whatever string query 464 that arises along with its contextual metadata 467 (i.e., "live" data) to the program analysis application 475. Further, the "live" nature of the operational environment can negate the use of the selection score calculator 414 in conjunction with the client application 462. That is, the client application 462 can be meant to be used for actual work and not for performing additional tasks to support training of the heuristic selection processor 434.

As in the instructional environment, the program analysis application 475 can continue to pass query requests 465 to the string analysis module 430. However, unlike in the instructional environment, the heuristic selection processor 434 of the string analysis module 430 can base its selection of string analysis algorithms 438 on the string analysis algorithm selection policy 442 with respect to the contextual metadata 467 of the query request 465 and/or selection rules 436.

In another contemplated embodiment, the heuristic selection processor 434 can be disabled in the operational environment. In such an embodiment, the dynamic string analysis handler 432 can be responsible for selecting the string analysis algorithms 438 in accordance with the string analysis algorithm selection policy 442. Additionally, in the event that the dynamic string analysis handler 432 receives a query request 465 containing a string query 464 and/or contextual metadata 467 not addressed by the string analysis algorithm selection policy 442, the dynamic string analysis handler 432 can be configured to invoke the heuristic selection processor 434 to handle the selection and update the string analysis algorithm selection policy 442.

Networks 450 and 485 can include any hardware/software/and firmware necessary to convey data encoded within carrier waves. Data can be contained within analog or digital signals and conveyed though data or voice channels. Networks 450 and 485 can include local components and data pathways necessary for communications to be exchanged among computing device components and between integrated device components and peripheral devices. Networks 450 and 485 can also include network equipment, such as routers, data lines, hubs, and intermediary servers which together form a data network, such as the Internet. Networks 450 and 485 can also include circuit-based communication components and mobile communication components, such as telephony switches, modems, cellular communication towers, and the like. Networks 450 and 485 can include line based and/or wireless communication pathways.

As used herein, presented data stores 440 and 480 can be a physical or virtual storage space configured to store digital information. Data stores 440 and 480 can be physically implemented within any type of hardware including, but not limited to, a magnetic disk, an optical disk, a semiconductor memory, a digitally encoded plastic memory, a holographic memory, or any other recording medium. Data stores 440 and 480 can be a stand-alone storage unit as well as a storage unit formed from a plurality of physical devices. Additionally, information can be stored within data stores 440 and 480 in a variety of manners. For example, information can be stored within a database structure or can be stored within one or more files of a file storage system, where each file may or may not be indexed for information searching purposes. Further, data stores 440 and/or 480 can utilize one or more encryption mechanisms to protect stored information from unauthorized access.

Figure 5:
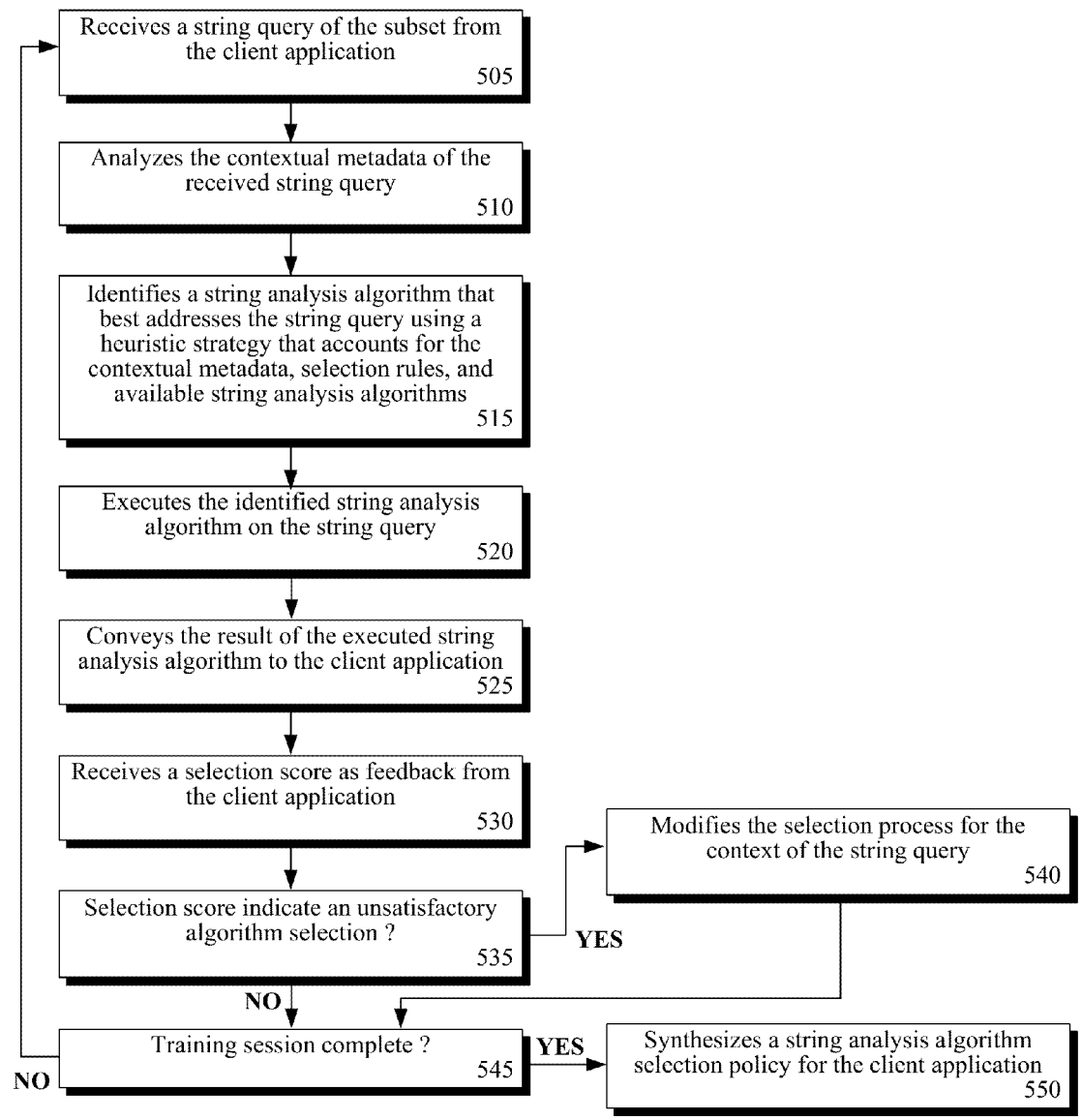
FIG. 5 is a flow chart of a method detailing the training of the dynamic string analysis handler in an instructional environment in accordance with embodiments of the inventive arrangements disclosed herein.

FIG. 5 is a flow chart of a method 500 detailing the training of the dynamic string analysis handler in an instructional environment in accordance with embodiments of the inventive arrangements disclosed herein. Method 500 can be performed within the context of system 400, and/or in conjunction with method 300.

Method 500 can begin in step 505 where the dynamic string analysis handler can receive string query of the subset of string queries from the client application. The contextual metadata of the received string query can be analyzed in step 510.

In step 515, a string analysis algorithm that best addresses the string query can be identified using a heuristic strategy that accounts for the contextual metadata, selection rules, and the available string analysis algorithms. Step 515 can be performed by the heuristic selection processor of the dynamic string analysis handler.

The identified string analysis algorithm can be executed on the string query in step 520. In step 525, the result of the executed string analysis algorithm can be conveyed to the client application.

Feedback containing a selection score for the results of the executed string analysis algorithm can be received from the client application in step 530. In step 535, it can be determined if the selection score indicates that selected string analysis algorithm unsatisfactorily addressed the string query. For example, the selection score can be compared to a predefined selection score threshold such that selection scores less than the threshold values are considered unsatisfactory.

When the selection score is determined to be unsatisfactory, step 540 can execute where the selection process for the context of the string query can be modified. Step 540 can encompass modifications to the selection rules and/or the inherent decision-making process employed by the heuristic selection processor (i.e., decision tree).

When the selection is determined to be satisfactory or upon completion of the modifications of step 540, it can be determined if the training session for the dynamic string analysis handler is complete in step 545. When the training session is not complete, flow can return to step 505 where the dynamic string analysis handler can repeat the steps of method 500 until completion of the training session. When the training is complete, step 550 can be performed where the string analysis algorithm selection policy can be synthesized for the client application.

Figure 6:
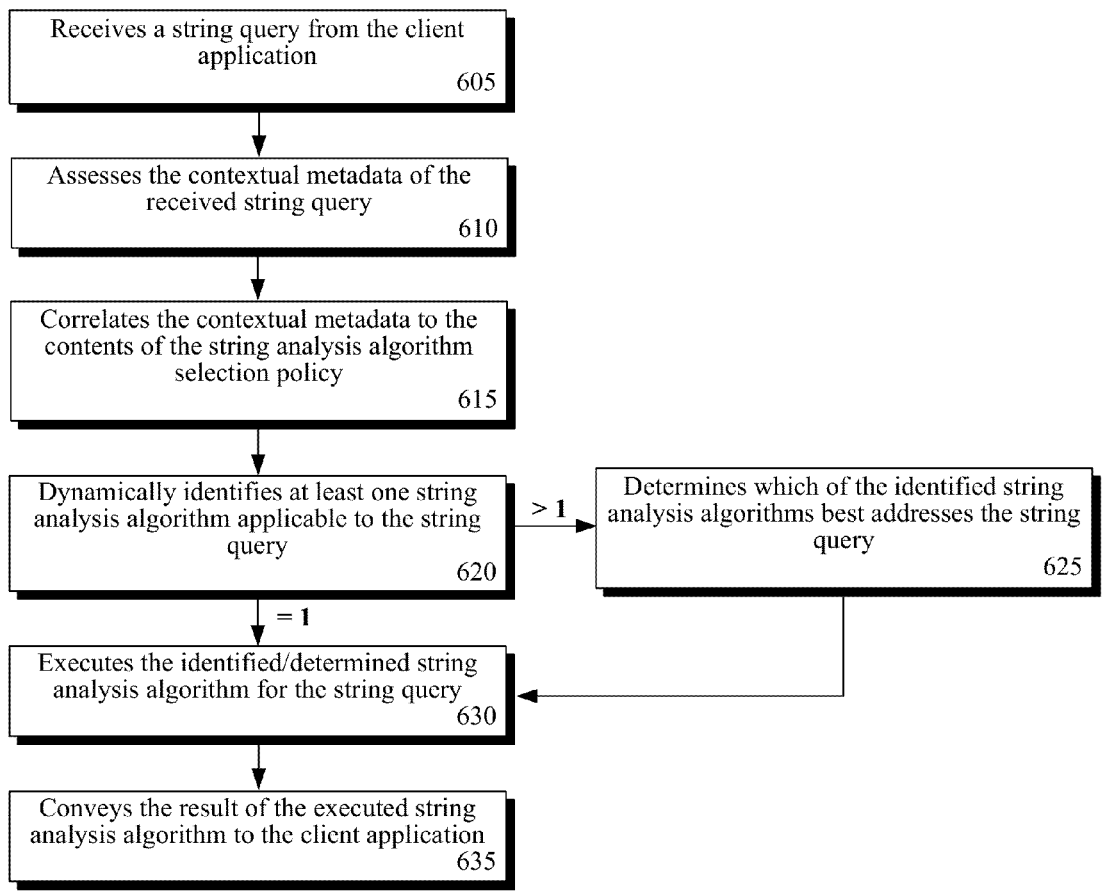
FIG. 6 is a flow chart of a method detailing operation of the dynamic string analysis handler in an operational environment in accordance with embodiments of the inventive arrangements disclosed herein.

FIG. 6 is a flow chart of a method 600 detailing operation of the dynamic string analysis handler in an operational environment in accordance with embodiments of the inventive arrangements disclosed herein. Method 600 can be performed within the context of system 400, and/or in conjunction with methods 300 and/or 500.

Method 600 can begin in step 605 where the dynamic string analysis handler can receive a string query from the client application. The contextual metadata of the received string query can be assessed in step 610.

In step 615, the contextual metadata can be correlated to the contents of the string analysis algorithm selection policy. At least one string analysis algorithm can be dynamically identified as being applicable to the string query in step 620.

When more than one string query is identified, step 625 can be executed where the identified string analysis algorithm that best addresses the string query can be determined. The dynamic string analysis handler can utilize the selection rules when performing step 625.

Upon completion of step 625 or when only one string analysis algorithm is identified as applicable, the identified/determined string analysis algorithm can be executed for the string query in step 630. In step 635, the results of the executed string analysis algorithm can be conveyed to the client application.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:
1. A system comprising:
a client application configured to issue query requests comprising a string query and a plurality of contextual metadata regarding the string query, wherein said string query requires string analysis;

a string analysis module configured to provide the client application with results of the string analysis responsive to issued query requests, said string analysis module further comprising:
- a plurality of string analysis algorithms representing different string analysis techniques; and
- a dynamic string analysis handler configured to, when in a training mode, utilize a heuristic strategy to synthesize a string analysis algorithm selection policy based upon interactions with the client application in an instructional environment, wherein an interaction comprises at least a query request from the client application, a response to the query request by the dynamic string analysis handler, and a selection feedback regarding the response from the client application, wherein the query request of the interactions utilizes a subset of string queries expected to be generated by the client application in an operational environment, and, when in a production mode, utilize the string analysis algorithm selection policy to dynamically select a string analysis algorithm from the plurality of string analysis algorithms to provide responses to query requests issued by the client application in the operational environment.

2. The system of claim 1, wherein, when in the instructional environment, said client application further comprises:
- a selection score calculator configured to determine a selection score for the selection feedback to the dynamic string analysis handler, wherein said selection score quantitatively expresses an effectiveness of the string analysis algorithm selected for the interaction, wherein the selection score is calculated using a predefined equation that expresses a culmination of a plurality of metrics measurable by the client application.

3. The system of claim 1, wherein the dynamic string analysis handler further comprises:
- a plurality of selection rules that define adjustments to the dynamic selection of the string analysis algorithm by the dynamic string analysis handler;
- a heuristic selection processor configured to employ the heuristic strategy of the dynamic string analysis handler to select the string analysis algorithm, wherein the selection of the string analysis algorithm by the heuristic selection processor utilizes the plurality of contextual metadata associated with the string query and the plurality of selection rules.

4. The system of claim 3, wherein, when in the instructional environment, said system further comprises:
- a selection feedback threshold defining a minimum value for an acceptable selection of the string analysis algorithm, wherein failure to meet the selection feedback threshold results in at least one modification to at least one of the heuristic selection processor, the plurality of selection rules, and the string analysis algorithm selection policy.

5. The system of claim 3, wherein at least one of the plurality of selection rules is user-configurable, wherein said user-configuration represents a preference for using the plurality of string analysis algorithms in different contexts.

6. The system of claim 1, wherein the client application is representative of a plurality of software applications, wherein the string analysis algorithm selection policy is able to be used for the plurality of software applications.

7. The system of claim 1, wherein the plurality of contextual metadata comprises at least parameters describing a level of complexity of software code originating the string query, a type of string analysis typically used for the string query, and a performance type of the software code originating the string query.

8. A computer program product comprising a computer readable storage medium having computer usable program code embodied therewith, the computer usable program code comprising:
- computer usable program code configured to, when operating in a training mode, handle a subset of a plurality of string queries having a plurality of contextual metadata received from a client application in an instructional environment, wherein an effectiveness of the handling of the subset of the plurality of string queries is based upon feedback from the client application, and, wherein the subset of string queries represents a spectrum of string queries expected to be generated by the client application in an operational environment;
- computer usable program code configured to, upon completion of the handling of the subset of the plurality of string queries, synthesize a string analysis algorithm selection policy for the client application, wherein said string analysis algorithm selection policy is based upon the handling of the subset of string queries while in the training mode, wherein the string analysis algorithm selection policy correlates a context of a string query in the subset to a usage of a string analysis algorithm; and
- computer usable program code configured to, when operating in a production mode, dynamically handle the plurality of string queries having the plurality of contextual metadata received from the client application in the operational environment in accordance with the string analysis algorithm selection policy, wherein the string analysis algorithm to be used for a string query is dynamically and independently determined.

9. The computer program product of claim 8, wherein handling of the subset of the plurality of string queries when operating in the training mode further comprises:
- computer usable program code configured to receive a query request from the client application, wherein said query request comprises the string query of the subset and the plurality of contextual metadata associated with the string query of the subset;
- computer usable program code configured to select a string analysis algorithm from a plurality of string analysis algorithms available for use by the string analysis module that best addresses the received query request, wherein said selection utilizes a heuristic strategy;
- computer usable program code configured to execute the selected string analysis algorithm upon the string query of the subset;
- computer usable program code configured to convey results of the execution of the selected string analysis algorithm to the client application;
- computer usable program code configured to receive selection feedback having a selection score from the client application for the results of the executed string analysis algorithm, wherein said selection score quantitatively expresses the effectiveness of the selected string analysis algorithm; and
- computer usable program code configured to, when the received selection feedback indicates an unsatisfactory selection of the string analysis algorithm, automatically modify the heuristic strategy with respect to at least one of the string query of the subset, the plurality of contextual metadata associated with the string query of the subset, and a plurality of selection rules that influence the heuristic strategy.

10. The computer program product of claim 9, wherein selecting of the string analysis algorithm further comprises:
- computer usable program code configured to analyze the plurality of contextual metadata associated with the string query of the subset;
- computer usable program code configured to identify at least one string analysis algorithm from the plurality of string analysis algorithms applicable to at least one of the analysis of the plurality of contextual metadata and the string query of the subset; and
- computer usable program code configured to, when multiple string analysis algorithms are identified, order the multiple string analysis algorithms by effectiveness to address the received query request as determined by the heuristic strategy, wherein the string analysis algorithm ordered as having a highest effectiveness is considered to best address the string query of the subset.

11. The computer program product of claim 8, wherein the dynamic handling of the plurality of string queries in the operational environment further comprises:
- computer usable program code configured to receive a query request from the client application, wherein said query request comprises a string query from the plurality of string queries and the plurality of contextual metadata associated with the string query;
- computer usable program code configured to assess the plurality of contextual metadata of the string query;
- computer usable program code configured to dynamically select the string analysis algorithm that best addresses the string query based upon the string analysis algorithm selection policy;
- computer usable program code configured to execute the dynamically-selected string analysis algorithm for the string query; and
- computer usable program code configured to convey results of the execution of the dynamically-selected string analysis algorithm to the client application.

12. The computer program product of claim 11, wherein, when the received string query is unaddressed by the string analysis algorithm selection policy, said dynamic selection of the string analysis algorithm further comprises:
- computer usable program code configured to analyze the plurality of contextual metadata associated with the string query that is unaddressed by the string analysis algorithm selection policy;
- computer usable program code configured to identify at least one string analysis algorithm from the plurality of string analysis algorithms applicable to at least one of the analysis of the plurality of contextual metadata and the string query;
- computer usable program code configured to determine the string analysis algorithm from the identified at least one string analysis algorithm that best addresses the string query using the heuristic strategy; and
- computer usable program code configured to update the string analysis algorithm selection policy to contain data for the string query and the determined string analysis algorithm.

13. A computer system comprising:
- one or more processors, one or more computer-readable memories and one or more computer-readable, tangible storage devices;
- program instructions, stored on at least one of the one or more storage devices for execution by at least one of the one or more processors via at least one of the one or more memories, to, when in an instructional environment, train of a dynamic string analysis handler of a string analysis module to effectively handle a subset of a plurality of string queries having a plurality of contextual metadata received from a client application, wherein the dynamic string analysis handler is operating in a training mode, wherein an effectiveness of the dynamic string analysis handler is based upon feedback from the client application, and, wherein the subset of string queries represents a spectrum of string queries expected to be generated by the client application in an operational environment;
- program instructions, stored on at least one of the one or more storage devices for execution by at least one of the one or more processors via at least one of the one or more memories, to, upon completion of the training, synthesize a string analysis algorithm selection policy for the client application, wherein said string analysis algorithm selection policy is based upon interactions between the dynamic string analysis handler and client application when handling the subset of string queries during training, wherein the string analysis algorithm selection policy correlates a context of a string query in the subset to a usage of a string analysis algorithm; and
- program instructions, stored on at least one of the one or more storage devices for execution by at least one of the one or more processors via at least one of the one or more memories, to, when in the operational environment, dynamically handle the plurality of string queries having the plurality of contextual metadata received from the client application in accordance with the string analysis algorithm selection policy by the dynamic string analysis handler, wherein the dynamic string analysis handler is operating in a production mode, wherein the string analysis algorithm to be used for a string query is dynamically and independently determined.

14. The computing system of claim 13, wherein program instructions to train the dynamic string analysis handler in the instructional environment further comprise:
- program instructions, stored on at least one of the one or more storage devices for execution by at least one of the one or more processors via at least one of the one or more memories, to receive a query request from the client application, wherein said query request comprises the string query of the subset and the plurality of contextual metadata associated with the string query of the subset;
- program instructions, stored on at least one of the one or more storage devices for execution by at least one of the one or more processors via at least one of the one or more memories, to, select a string analysis algorithm from a plurality of string analysis algorithms available for use by the string analysis module that best addresses the received query request, wherein said selection utilizes a heuristic strategy;
- program instructions, stored on at least one of the one or more storage devices for execution by at least one of the one or more processors via at least one of the one or more memories, to, execute the selected string analysis algorithm upon the string query of the subset;
- program instructions, stored on at least one of the one or more storage devices for execution by at least one of the one or more processors via at least one of the one or more memories, to, convey results of the execution of the selected string analysis algorithm to the client application;
- program instructions, stored on at least one of the one or more storage devices for execution by at least one of the one or more processors via at least one of the one or more memories, to, receive selection feedback having a selection score from the client application for the results of the executed string analysis algorithm, wherein said selection score quantitatively expresses the effectiveness of the selected string analysis algorithm; and program instructions, stored on at least one of the one or more storage devices for execution by at least one of the one or more processors via at least one of the one or more memories, to, when the received selection feedback, indicate an unsatisfactory selection of the string analysis algorithm, automatically modifying the heuristic strategy with respect to at least one of the string query of the subset, the plurality of contextual metadata associated with the string query of the subset, and a plurality of selection rules that influence the heuristic strategy.

15. The computer system of claim 14, wherein program instructions for selecting the string analysis algorithm further comprises:

program instructions, stored on at least one of the one or more storage devices for execution by at least one of the one or more processors via at least one of the one or more memories, to, analyze the plurality of contextual metadata associated with the string query of the subset;

program instructions, stored on at least one of the one or more storage devices for execution by at least one of the one or more processors via at least one of the one or more memories, to, identify at least one string analysis algorithm from the plurality of string analysis algorithms applicable to at least one of the analysis of the plurality of contextual metadata and the string query of the subset; and program instructions, stored on at least one of the one or more storage devices for execution by at least one of the one or more processors via at least one of the one or more memories, to, when multiple string analysis algorithms are identified, order the multiple string analysis algorithms by effectiveness to address the received query request as determined by the heuristic strategy, wherein the string analysis algorithm ordered as having a highest effectiveness is considered to best address the string query of the subset.

16. The computer system of claim 13, comprising:

a client application configured to issue query requests comprising the string query and the plurality of contextual metadata regarding the string query, wherein said string query requires string analysis;

a string analysis module configured to provide the client application with results of the string analysis responsive to issued query requests, said string analysis module further comprising:

a plurality of string analysis algorithms representing different string analysis techniques; and a dynamic string analysis handler configured to, when in the training mode, utilize a heuristic strategy to synthesize the string analysis algorithm selection policy based upon interactions with the client application in an instructional environment, wherein an interaction comprises at least a query request from the client application, a response to the query request by the dynamic string analysis handler, and a selection feedback regarding the response from the client application, wherein the query request of the interactions utilizes the subset of string queries expected to be generated by the client application in the operational environment.

\* \* \* \* \*